(12) United States Patent
Lee et al.

(10) Patent No.: US 12,436,936 B1
(45) Date of Patent: Oct. 7, 2025

(54) FILE DIRECTORY STRUCTURE AND NAMING CONVENTION FOR STORING COLUMNAR TABLES

(71) Applicant: Rapid7, Inc., Boston, MA (US)

(72) Inventors: Austin Lee, Burbank, CA (US); Vikram Jiandani, Los Angeles, CA (US)

(73) Assignee: Rapid7, Inc., Boston, MA (US)

( * ) Notice: Subject to any disclaimer, the term of this patent is extended or adjusted under 35 U.S.C. 154(b) by 0 days.

(21) Appl. No.: 18/795,246

(22) Filed: Aug. 6, 2024

Related U.S. Application Data

(63) Continuation of application No. 17/668,444, filed on Feb. 10, 2022, now Pat. No. 12,079,194.

(51) Int. Cl.
 *G06F 16/23* (2019.01)
 *G06F 16/22* (2019.01)

(52) U.S. Cl.
 CPC ........ *G06F 16/2329* (2019.01); *G06F 16/221* (2019.01); *G06F 16/2282* (2019.01)

(58) Field of Classification Search
 CPC . G06F 16/2329; G06F 16/221; G06F 16/2282
 See application file for complete search history.

(56) References Cited

U.S. PATENT DOCUMENTS

| | | |
|---|---|---|
| 11,263,184 B1 | 3/2022 | Ozen et al. |
| 11,360,982 B1 * | 6/2022 | Liu ..................... G06F 16/2433 |
| 11,567,969 B2 | 1/2023 | Graefe et al. |
| 11,880,368 B2 * | 1/2024 | Kondiles .......... G06F 16/24556 |
| 2014/0372702 A1 | 12/2014 | Subramanyam et al. |
| 2017/0103116 A1 | 4/2017 | Hu et al. |
| 2019/0179943 A1 | 6/2019 | Yang et al. |
| 2020/0125546 A1 | 4/2020 | Hedge et al. |
| 2020/0195476 A1 | 6/2020 | Chu et al. |
| 2021/0081378 A1 | 3/2021 | Hu et al. |
| 2022/0027265 A1 | 1/2022 | Li |
| 2022/0100715 A1 | 3/2022 | Lee et al. |

* cited by examiner

*Primary Examiner* — Dangelino N Gortayo

(74) *Attorney, Agent, or Firm* — Ashwin Anand; Lei Sun

(57) ABSTRACT

A database system stores a table as a set of column files in a columnar format in a manner that improves the write performance of the table and avoids use of separate metadata repository. In embodiments, each column file groups values into entity chunks indexed by an entity index. Each chunk includes a live value index that determines which rows in chunk has live values. New values are written to the column file by appending an updated copy of the entity chunk. The entity index to refer to the newly written chunk as the latest version. This approach avoids expensive in-place updating of individual column values and allows the update to be performed much more quickly. In embodiments, the database system encodes metadata such as table schema information using file naming and placement conventions in the file store, so that a centralized metadata repository is not required.

20 Claims, 11 Drawing Sheets

| 4 bytes | 8 bytes | 1 byte | 4 bytes | 4 bytes | 4 bytes | 4 bytes | 36 bytes |
|---|---|---|---|---|---|---|---|
| entity ID 380 | version 381 | deleted 382 | chunk offset 383 | value length 384 | free space length 385 | decoded length 386 | instance ID 390 |
| 1232 | 1 | 0 | 0 | 10 | 2 | 15 | 10a29f |
| 4432 | 123 | 0 | 12 | 14 | 4 | 16 | x29-woo9 |
| 4444 | 2 | 1 | 30 | 5 | 5 | 20 | b2e284:sfo:193 |
| 6644 | 55 | 0 | 40 | 30 | 10 | 100 | 8302a4 |
| ... | | | | | | | |

FILE DIRECTORY STRUCTURE AND NAMING CONVENTION FOR STORING COLUMNAR TABLES

CROSS-REFERENCE TO RELATED APPLICATIONS

This application is a continuation of and claims priority to U.S. patent application Ser. No. 17/668,444, filed Feb. 10, 2022, which is hereby incorporated by reference in its entirety.

BACKGROUND

Many distributed database systems (e.g. PRESTODB) use columnar storage formats to store table data (e.g. APACHE PARQUET). These database systems may distribute the table data in a compressed form over a set of column files in an underlying file system. The distribution allows the database system to parallelize query execution for faster reads. However, a number of problems remain with current columnar storage formats when it comes to building and updating the table data. First, due to the way the data is organized in the column files and the metadata stored in the files, a simple table update can be costly in terms of time and complexity. It is for this reason that many current columnar storage formats (including PARQUET) are provided as immutable formats. Second, current storage formats are not aware of application-level entities in the data. This issue makes most current storage formats unsuitable for applications that perform frequent full state updates to individual entities. Third, current columnar databases typically require a tight coupling between the data files and a centralized metadata store. The centralized metadata store represents a single point of failure and resource contention, making database schema changes rigid operations. There is a general need for improved columnar data storage in database systems to overcome these problems in state of the art.

SUMMARY OF EMBODIMENTS

The systems and methods as described herein may be employed in various combinations and in embodiments to implement a database system that stores a table as a set of column files in a columnar format, in a manner that improves the write performance of the table and avoids use of separate metadata repository. In some embodiments, each column file groups values into entity chunks indexed by an entity index. Each chunk includes a live value index that determines which rows in chunk has live values. New values are appended to the column file by writing a complete copy of the entity chunk updated with the new values. The old chunk becomes dormant after the writer updates the entity index to refer to the newly written chunk as the latest version. This approach avoids expensive in-place updating of individual column values and allows the update to be performed much more quickly. In some embodiments, the database system encodes metadata such as table schema information using file naming and placement conventions in the file store, so that a centralized metadata repository is not required.

Figure 1:
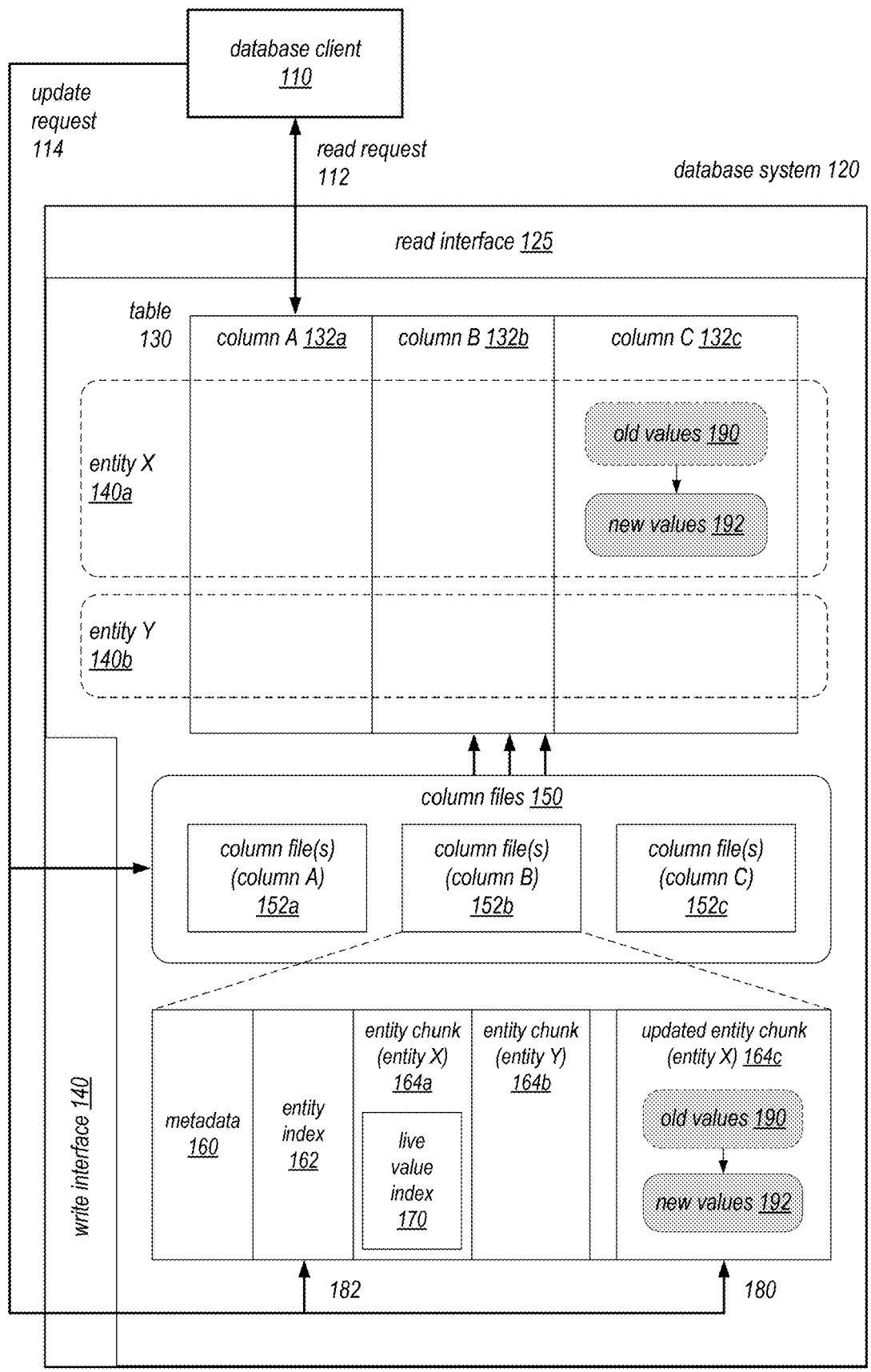
FIG. 1 is a block diagram illustrating a database system that uses a columnar data storage format to enable per-entity updates in the column files, according to some embodiments.

While embodiments are described herein by way of example for several embodiments and illustrative drawings, those skilled in the art will recognize that embodiments are not limited to the embodiments or drawings described. It should be understood that drawings and detailed description included herein are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Embodiments of a database system are disclosed herein that use a columnar data storage format to enable fast per-entity updates in column files. Table data is stored across the column files that correspond to respective columns of the table. The data values in each column file are grouped according to their entity, which may be indicated by the primary key of the table. A set of file naming and placement conventions are used to store the column files so that the need for a centralized metadata store is eliminated. The file naming and placement conventions are based on universal file system semantics that can be implemented in any type of file system.

In some embodiments, the database system updates the table data by performing "soft" updates and deletes. That is, when the database system updates or deletes values in the table, it does not immediately overwrite or remove these values in the column files. Rather, the soft update and delete operation appends a modified copy of the entity chunk(s) to the end of the column file. The writer then modifies an entity index embedded in the column file, so that the old chunk is rendered invisible to subsequent table reads. In this manner, table writes can be completed relatively quickly without having to overwrite values in the middle of the file. In some embodiments, as the number of dead entity chunks grows in the file over time, the database system may perform a compaction process that sweeps the file to eliminate the dead chunks. The compaction process may be performed during off-peak times or on a copy of the file, so that it does not affect perceived database performance.

In some embodiments, the column files are stored in a directory structure based on a set of file naming and placement conventions that can be implemented in a variety of file systems, including cloud-based storage services such as AWS S3 or traditional network- or disk-based file systems. The database system provides a set of APIs for defining new tables and columns in the database. When the table is read, the table reader will rely on the conventions to dynamically discover and infer the table schema from the column files. In some embodiments, the table write API allows a client to add new columns or create the table upon the first write, without having to explicitly pre-define the table schema. In some embodiments, the table write API allows the client to define an automatic grouping of time-based data into regular time intervals. The API provides users full control over the type of interval they want to use to window the data (hourly, daily, weekly, etc.). In some embodiments, the write API may allow users to define other types of data groupings (e.g. row groups or column groups), so that a group of related data in a table can be updated or downloaded as a collective unit.

As will be appreciated by those skilled in the art, embodiments of the database system as described herein provide many technical advantages over existing database systems in the state of the art, to improve upon the functioning of these existing systems. These and other features and benefits of the disclosed database system are described in detail below, in connection with the figures.

FIG. 1 is a block diagram illustrating a database system that uses a columnar data storage format to enable per-entity updates in the column files, according to some embodiments.

As shown, the depicted database system 120 is configured to receive read requests 112 and updates requests 114 from a database client 110. The database system 120 provides a read interface 125 and a write interface 140, which may be programmatic interfaces such as APIs or user interactive interfaces such as GUIs. In some embodiments, the database system 120 may be a SQL database that allows users to access stored tables using SQL. In some embodiments, the database system 120 may be a distributed database system that is implemented using a group of connected compute or storage nodes.

As shown in this example, the database system 120 stores a data table 130, which includes three columns 132a-c. The rows in the table 130 are associated with different entities, including two entities X 140a and Y 140b. As an example, table 130 may store information about products, and each entity may correspond to a different product. In some embodiments, the entity may be indicated by the primary key of the table 130, so that there is only one row in the table for each entity 140.

As shown, the data of the table 130 is stored in an underlying storage layer or subsystem, which stores the data as a set of column files 150. Each column 132a-c may be associated with a respective set of one or more column files 152a-c. In some embodiments, the column files for each column may be stored in a separate directory. In some embodiments, there may be only one column file for each column.

The column files 150 may be stored in a file store, which may be a cloud-based file storage service such as AWS S3, or a traditional network- or disk-based file system. In some embodiments, the file store may be a distributed file store that stores file data across many storage nodes. The file store may implement a strongly consistent write model where, when a write request is acknowledged as completed, all subsequent reads from the file store will reflect the completed write. In some embodiments, a more relaxed consistency model that allows for eventually consistent writes may be used.

In some embodiments, the database system 120 may include database engine nodes that directly interact with clients 110 and use database readers and writers to perform read and write requests from the clients. In some embodiments, the database system 120 may be able to access a variety of underlying data sources by using different types of dynamically loaded connectors. For example, the database system (e.g. PRESTODB) may be able to access data from different types of data store using multiple different connectors. In some embodiments, the database readers and writers may be programmed to implement the specifics of the column file formats described herein. Custom readers and writers may be created to further customize the file formats.

In some embodiments, each column file 152 may represent a column of the table 130 and contain column values of a subset of rows in the table. For example, column A 132a of the table may be stored using three column files, each file holding a subset of the values in column A. Column files are grouped together based on how they are placed in the directory structure for the table. In some embodiments, all column files associated with the same column can be placed in the same directory. In some embodiments, column files of related columns may be stored in a common directory. In some embodiments, all column files for the table may be placed in a single directory. In some embodiments, the database writer will ensure that all column files for the table store data in the same row order, so that the database reader can easily assemble row results across the column files.

In some embodiments, each column file 152 may be stored in a binary storage format. The format allows sections of the file to be compressed according to the client's preference. For example, the write API of the database system may allow the client to choose whether contents of the files should be compressed and/or indicate a particular compression algorithm to use (e.g. ZSTD). Each column file (e.g. column file B 152b) may include a metadata section 160 that stores metadata about the column file, including when the file was created and last updated, any compression parameters, endian parameters, and/or data or data usage statistics.

In some embodiments, each column file 152 includes an entity index 162 and a values section that is organized into entity chunks (e.g. entity chunks 164a for entity X and 164b for entity Y). The entity index 162 may be used to keep track of what parts of the values section correspond to which entity (e.g. the location of the entity chunks in the file). Each entity may have a unique entity identifier that is equivalent to a primary key. In some embodiments, the entity index may also indicate other metadata about each entity in the file, such as a version of the entity, a time when the entity is created, a soft delete flag for the entity, among other metadata. Such metadata may be used by the storage subsystem to manage the entities.

In some embodiments, the entity identifier or primary key may be stored as another column file in the file store. In such embodiments, the entity metadata may be stored in the entity identifier column file. The entity identifier column file may not be directly writable by the write API of the table. Rather, the entity identifier column file may be automatically built by the storage system when the table is created or updated. For example, when a batch of writes to the table is committed, the storage system can scan and analyze the data and update the entity identifier column file as necessary. In some embodiments, the entity identifier column file may provide another API that allows a more trusted user (e.g. an administrator) to directly modify the entity metadata.

In some embodiments, the values section of the column file holds the individual entity chunks, each of which may be stored as a continuous section of the data that holds the column values associated with an entity. Each entity chunk (e.g. entity chunk X 164a) may contain a live value index 170. The live value index 170 may be used to track which values in the entity chunk are live and which values are not live (e.g. null values). In some embodiments, the live value index 170 may be implemented using one or more Roaring bitmaps, which is a type of compressed bitmap that is compressed based on run-length encoding and enables fast checking of individual bits in the bitmap.

When the database system 120 receives an update request 114 to the table 130 (here for entity X), the system performs a soft update operation that does not overwrite or modify the old or pre-update values 190 of the table. Rather, an updated copy 164c of the affected entity chunk 164a is created, where the old values 190 in the chunk are replaced new values 192, as specified by the update request 114. The updated copy 164c is appended 180 to the ended of the column file. Further, the entity index 162 of the file is updated 182 to indicate that the newly appended chunk 164c is now the live version of the chunk for entity X. This update causes the old version of the chunk 164a to become dormant or obsolete, and invisible to subsequent table readers. This update process can be carried out for all entities and across all column files affected by the update request 114.

Deletes of values in an entity chunk can also be performed without modifying the old chunk in the column file. Similar to the update, the database system will create a new version of the affected entity chunk to remove the values deleted, and append a new entity chunk to the column file. The entity index of the of the column file will then be updated to refer to the new entity chunk as the active chunk and make the old entity chunk obsolete. In some embodiments, if a delete request deletes all values for an entity, the database system may automatically delete the entire entity in the column files. Soft deletions of an entire entity chunks are discussed in connection with FIG. 4B.

In some embodiments, when the amount of dormant or obsolete chunks in a column file exceeds a limit, the database system 120 may perform a compaction process on the file. The compaction may scan the file using the entity index 162 in the file and rebuild the column file with all the dead chunks removed. The database system 120 may allow users to configure different types of triggering conditions for the compaction, such as regular time intervals, file space thresholds, or other types of conditions.

When reading the column files, embodiments of the database system 120 provide database readers that understand the column format to pull the active or live portions of the file into memory. The readers will then perform a series of tasks to process the in-memory data to return the actual column data, for example, by uncompressing the entity chunks and filling in null values according to the live value index.

Figure 2:
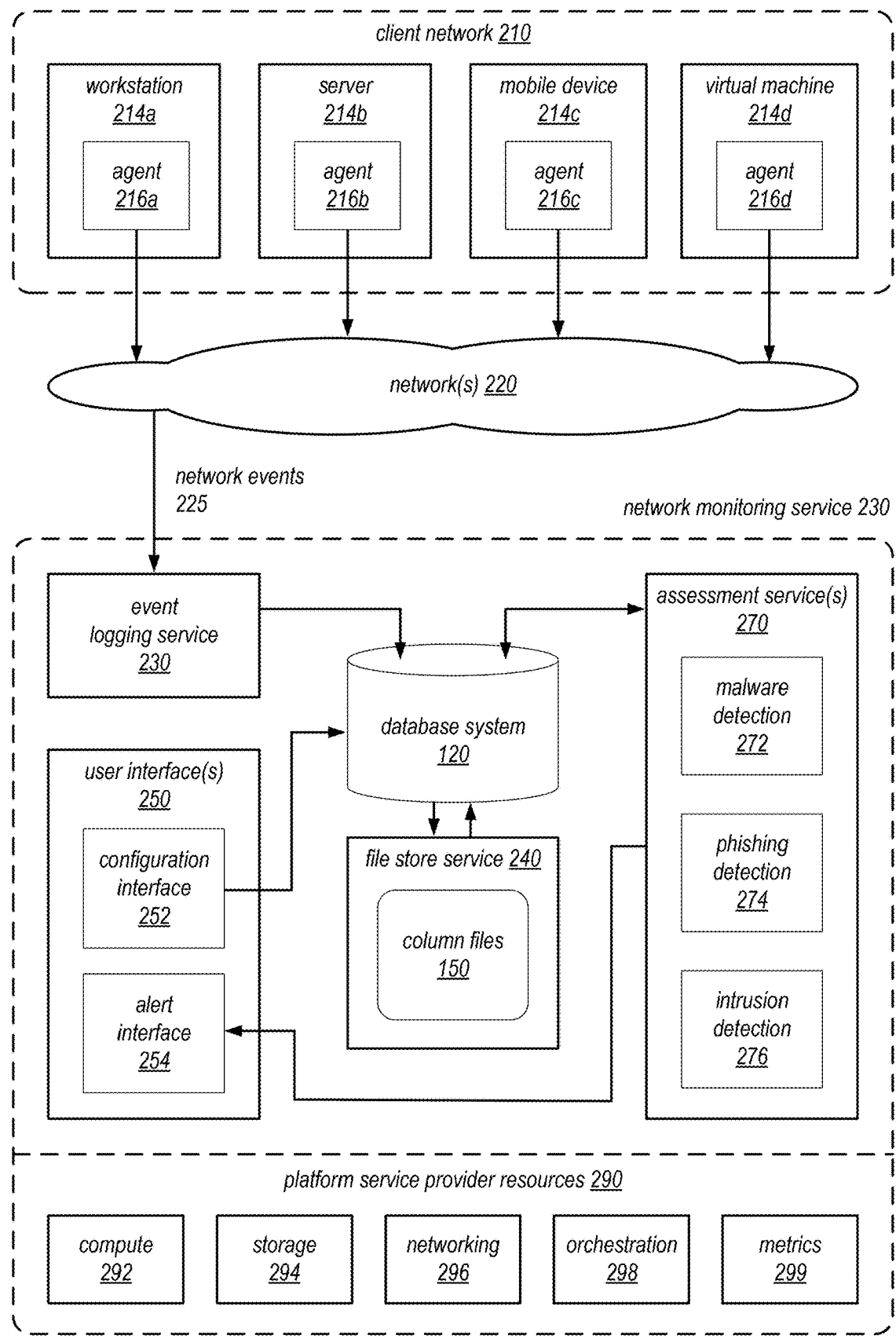
FIG. 2 is a block diagram illustrating a network monitoring service implemented in a platform service provider network that implements a database system using the columnar data storage format, according to some embodiments.

FIG. 2 is a block diagram illustrating a network monitoring service implemented in a platform service provider network that implements a database system using the columnar data storage format, according to some embodiments.

As shown in FIG. 2, an instance of the database system 120 is implemented in a network monitoring service 230. In some embodiments, the network monitoring service 230 may be a service implemented in the cloud and on a platform service provider network, such as a platform-as-a-service (PaaS) network, an infrastructure-as-a-service provider (IaaS) network, or a software-as-a-service (SaaS) network. The network monitoring service 230 may be configured to communicate with many agents 216a-d deployed on machines 214a-d in a client network 210. The agents 214 may communicate with the network monitoring service 230 over one or more intermediary networks 220. In some embodiments, the agents may be configured to collect or compile network activity data or events 225, and transmit the data to the network monitoring service 230. The network monitoring service 230 may receive network activity data from many different client networks operated by different entities, companies, organizations, groups, etc., and perform remote monitoring of the networks of these different clients.

As shown, the client network 210 in this example includes different types of computing resources, such as a workstation 214a, a server 214b, a mobile device 214c, and a virtual machine 214d. The virtual machine 214d may be an instance of a computer and operating system that is emulated and hosted on a physical virtual machine host. The virtual machine host may implement virtualization hardware and/or software (e.g. a hypervisor) to execute and manage multiple instances of guest operating systems. Example implementations of such virtualization technologies include VMWARE ESX/ESXI, MICROSOFT HYPERV, AMAZON WEB SERVICES, and MICROSOFT AZURE. Another type of virtualized execution environment may be a hosted container, which provides a portable and isolated execution environment over a host operating system of a physical host. Examples of container hosting technologies include DOCKER, GOOGLE KUBERNETES, AMAZON WEB SERVICES, and MICROSOFT AZURE. In some embodiments, the virtual machine 214d may be hosted in a platform service provider network, such as the platform service provider network that is hosting the network monitoring service 230. Depending on the embodiment, the agents 216 may be deployed on other types of computing systems, including embedded systems, networking devices, storage devices, Internet-of-Things (IoT) devices, vehicles, and the like.

In various embodiments, the network 220 may encompass any suitable combination of networking hardware and protocols necessary to enable communications between the agents 216 and the network monitoring service 230. In some embodiments, the remote machines 214 may execute in a private network of a company, behind a company firewall, and the network 220 may include a public network such as the Internet, which lies outside the firewall. The network 220 may encompass the different telecommunications networks and service providers that collectively implement the Internet. In some embodiments, the network 220 may also include private networks such as private local area networks (LANs), private wide area networks (WANs), or private wireless networks. The network 220 may be implemented using different hardware (e.g., modems, routers, switches, load balancers, proxy servers, etc.) and software (e.g., protocol stacks, routing software, firewall/security software, etc.) for establishing networking links between the remote machines 214 and the network monitoring service 230. In some embodiments, the agents 216 may transmit the network events 225 to the network monitoring service 230 over secure communication channels such as transport layer security (TLS) connections implemented over the network 220.

As shown in this example, the network monitoring service 230 is implemented using a number of supporting services 230, 240, 250, and 270 implemented by the platform service provider network. Clients of the network monitoring service 230 may convey service requests to and receive responses from these services via their respective service interfaces. In some embodiments, the service request and responses may be defined as part of a RESTful API (e.g. one or more web services). The requests and responses may be formatted as JSON documents. In some embodiments, the network monitoring service 230 may implement service interfaces using other types of remote procedure calling protocols, such as GOOGLE PROTOCOL BUFFERS. The platform service provider network may provide the hardware and/or software needed to implement service endpoints for these services, and the request routing facilities to ensure that a request is properly routed to the appropriate endpoints.

As shown, the platform service provider network may provide different types of computing resources 290, which can be leased by customers to implement hosted services. As shown, the platform service provider may provide resource services such as compute resource service 292, storage resource service 294, networking resources service 296, orchestration service 298, and resource metrics service 299. The services of the network monitoring service 230 may be built using these underlying resource services provided by the platform service provider. In some embodiments, the platform service provider resources 290 may implement features such as load balancing of service requests and/or dynamic management and scaling of service node pools. In some embodiments, each of the services 240, 250, and 270 may be implemented using a pool of service nodes provided by the platform service provider, which may be individual instances of virtual machines. In some embodiments, the platform service provider may be a provider such as AMAZON WEB SERVICES or MICROSOFT AZURE.

In some embodiments, the network monitoring service 230 may be configured to monitor, analyze, and take action on security-related incidents that are detected in the remote client networks 210. In some embodiments, the network monitoring service 230 may implement an event logging service 230 that receives network events 225 from the remote client network and stores the received data as event logs the database system 120. The event logging service 230 may implement service functionality to allow users or other software components to query the event logs stored in the database system 120. As shown in this example, the column files 150 of the database system 120 are stored by a file store service 240 provided by the platform service provider network. In some embodiments, the file store 240 may be implemented using AWS S3 or APACHE HDFS.

As shown, in some embodiments, the assessment service(s) 270 may implement a variety of monitoring processes to generate alerts in response to detected security problems in the client network 210. These alerts may be forwarded to an alert interface 254, which will allow human security analysts to perform a more in-depth examination of the underlying security problems. For example, in some embodiments, a malware detection module 272 may examine collected machine event logs to detect installation of a particular type of malware executable. As another example, a phishing detection module 274 may examine the email event logs to detect phishing attacks using new or unusual email addresses, web addresses, or email content. As yet another example, an intrusion detection module 276 may examine the network event logs to detect suspicious communication patterns or attacker packet signatures. In some embodiments, the alerts generated by the assessment service(s) 270 may trigger automated mitigation actions to be performed on the client network 210 to address detected threats in the client network.

As shown, in some embodiments, the network monitoring service 230 may implement one or more user interface(s) 250, which may be implemented as GUIs or web interfaces viewable using a web browser. In some embodiments, these user interfaces 250 may be implemented by client-side applications. As shown, the user interfaces may include the alert interface 254 to notify users of detected alerts. In some embodiments, the alert interface 254 may be accessible from both the client network 210 and a central monitoring location where security analysts are monitoring the client network.

In some embodiments, the user interface(s) 250 may also implement a configuration interface 252. The configuration interface 252 may be used to configure various aspects of the network monitoring system 230, including the database system 120. For example, the configuration interface 252 may be used to control various aspects of how the column files 150 are stored and managed, including the compression and/or encryption of the files 150, triggering conditions for file compaction, and storage policies relating to sharding, replication, and/or data retention, among other types of configuration parameters.

Figure 3A:
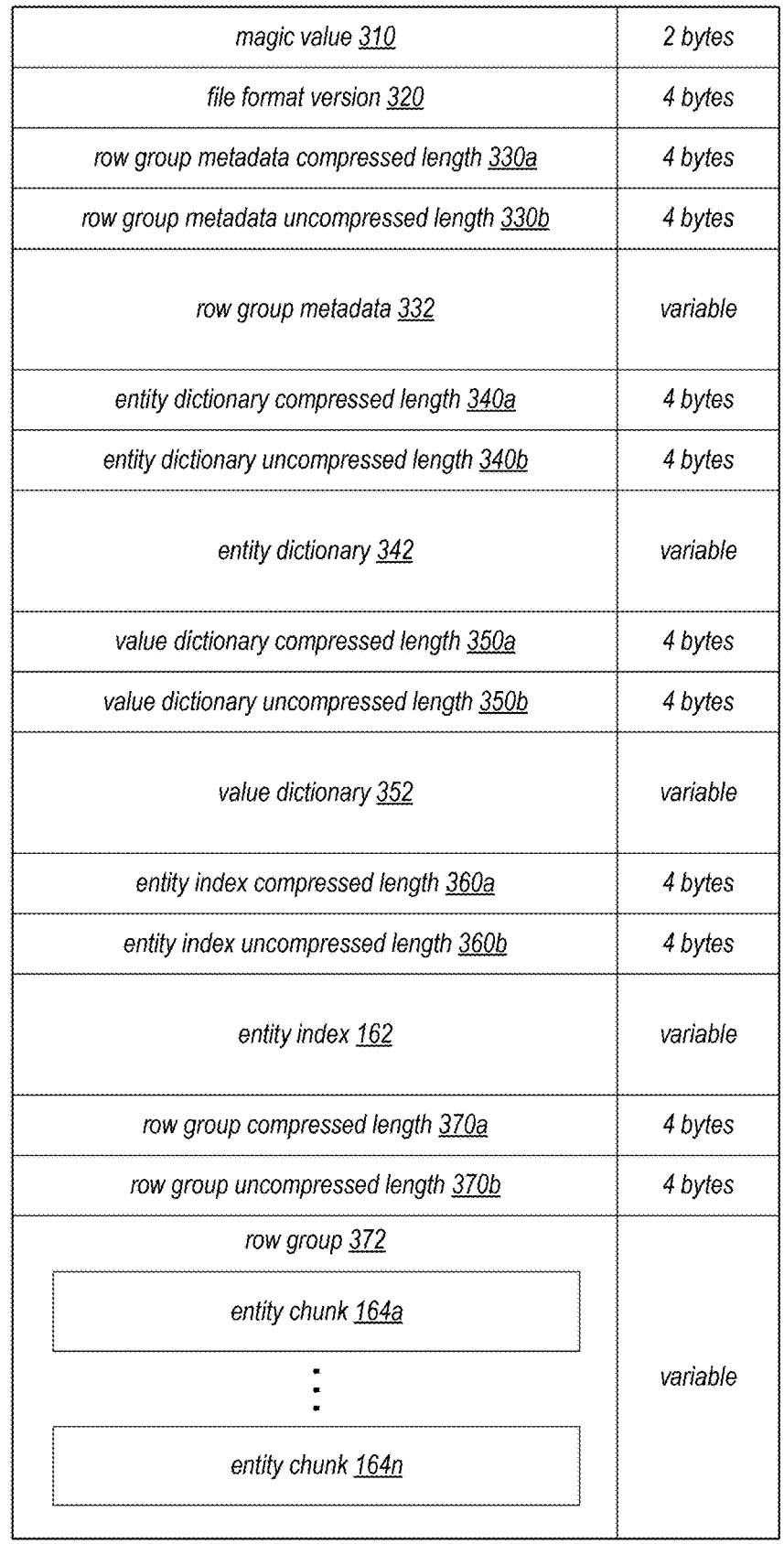
FIG. 3A illustrates a column file that uses an example of the columnar data storage format, according to some embodiments.

FIG. 3A illustrates a column file that uses an example of the columnar data storage format, according to some embodiments.

As shown, column file 152 in this example includes a number of sections in accordance with columnar data storage format. The lengths of the sections are shown in the right-hand column. In some embodiments, the column file starts with a two-byte magic value 310. This magic value 310 may be used by database readers and writers to recognize a column file. In some embodiments, a file format version identifier 320 is included in the column file. Database readers and writers may parse the version to determine whether the file is formatted in a version that they can support.

As shown, each subsequent section of the column file 152 is preceded by a compressed length (330a, 340a, 350a, 360a, 370a) and an uncompressed length (330b, 340b, 350b, 360b, 370b) of the section. Both of the length fields are allocated to use four bytes. In some embodiments, if a section is uncompressed, the compressed value should be zero. The uncompressed value should reflect the length of the data before it was compressed.

In some embodiments, the row group metadata 332 may correspond to the metadata 160 discussed in connection with FIG. 1. In embodiments where a single column is divided into multiple column files, the rows assigned to each file may be referred to as a "row group." The row group metadata 332 may be used to store metadata about the row group in the column file. In some embodiments, the metadata 332 may be stored in a JSON format. The metadata 332 may include data such as the column data type, a last update time of the column file, a last compaction time of the column file, an indication of whether values in the column file are compressed, and a compression algorithm used to compress values in the column file. In some embodiments, the metadata 332 may also include data statistics such as the number of row values that are stored in the column file, a number of distinct values stored in the column file (e.g. cardinality), a maximum value stored in the column file, and a minimum value stored in the column file. The metadata 332 may be used by database readers and writers to access the data in an efficient manner. For example, a database reader may use the minimum and maximum values to determine that the row group does not contain any values that satisfy a particular query, and thus avoid scanning the row group for the query.

In some embodiments, the column file 152 may include an entity dictionary 342 and a value dictionary 352. The dictionaries may be used to optimize storage space for values that are repeated frequently. Highly repetitive values may be replaced in the row group section 372 with more compact tokens in order to reduce space. The dictionaries may be used to store the mapping between such tokens and the actual values. In some embodiments, the dictionaries may be used to convert a variable length data type to a fixed length data type, so that later sections of the file can be stored in predictable pages or chunks. Depending on the embodiment, the dictionaries may be stored in JSON format or a more efficient dictionary format. In some embodiments, the database readers and writers may support bidirectional translation between the dictionary values and the actual values.

As discussed in connection with FIG. 1, the entity index 162 is a section of the column file 152 that keeps track of the location of entity chunks in the columns row group section 372. For example, the entity index 162 indicates a location offset and a length for each entity chunk in the file. As discussed in connection with FIG. 1, new versions of an entity chunk may be created in the file as the values in the entity chunk are updated. Thus, in some embodiments, the entity index 162 may be used to track which version of the entity chunk is currently active, and which version(s) are inactive and may be garbage collected. The entity index 162 may also contain entity metadata for each entity in the file, which will be discussed in detail in connection with FIG. 3B.

In some embodiments, the row group section 372 will contain all of the actual values in the row group. As discussed, the values will be grouped into entity chunks 164a-n, according to the entity index 162. Accordingly, all values for a particular entity can be easily read and written as a unit. As discussed in connection with FIG. 1, each entity chunk represents the state of an entity in the column file and at a certain point in time. The live entity chunk for an entity visible in the database table is indicated by the entity index.

Figure 3B:
FIG. 3B illustrates an entity index used in an example of the columnar data storage format, according to some embodiments.

FIG. 3B illustrates an entity index used in an example of the columnar data storage format, according to some embodiments.

As shown, entity index 162 in this example stores eight attributes for each entity in the column file. The length of each attribute is shown at the top of the attribute. The entity ID 380 is an identifier of the entity. In some embodiments, the entity ID is unique across all entities in the table.

In some embodiments, the entity version 381 is used to define an entity's version number. This attribute is optional and may be used by the database system to enforce certain storage policies, for example, to store only data associated with entities of a latest version. In some embodiments, the version field 381 may be used to denote whether an entity chunk is the live version of the entity in the column file. The currently live entity chunk in the column file may be assigned a special version number, such as zero. All other versions of the entity chunk may be assigned a non-zero version number, which may be in a specific order, to indicate that they are obsolete chunks.

In some embodiments, the deleted flag 382 is a one-byte indicator that indicates whether an entity has been soft deleted. As with individual values in the column file, an entire entity may be soft deleted by setting this flag. The entity chunk of a deleted entity may be removed from the column file during a compaction process.

In some embodiments, the chunk offset 383 indicates the starting location of the entity chunk within the row group section 372. The chunk offset value acts like a pointer that points to a location within the row group section.

In some embodiments, the value length 384 indicates the length of the used space 172 of the entity in terms of bytes. Thus, if the chunk offset is 10 and the value length is 10, then the values in the entity chunk will range from byte 10 to byte 20 within the row group section.

In some embodiments, the free space length 385 indicates the number of bytes that are reserved for null values in the free space 174 of the entity chunk. The sum of the value length and the free space length is the total number of bytes allocated for the entity chunk. The free space length may be derived from the live value index 170 of the entity chunk.

In some embodiments, the decoded length 386 indicates the byte length of the entity chunk after it is decoded and decompressed. This length allows database readers to determine exactly how much memory to allocate while loading a column file or an entity into memory.

In some embodiments, the instance ID 390 contains optional additional information about the entity at the application level. For example, the instance ID may be used to link or correlate the entity to an instance of an object (e.g. an event object) that represents the entity's current state. In some embodiments, instance IDs may be formatted as UUID-4 values.

Depending on the embodiment, the entity index 162 may be used to store a variety of other metadata about the entities. For example, though not shown here, embodiments of the entity index may store timestamp values indicating when each entity was created or last modified. Such metadata may be used by the database system to perform a variety of entity management tasks.

Figure 4A:
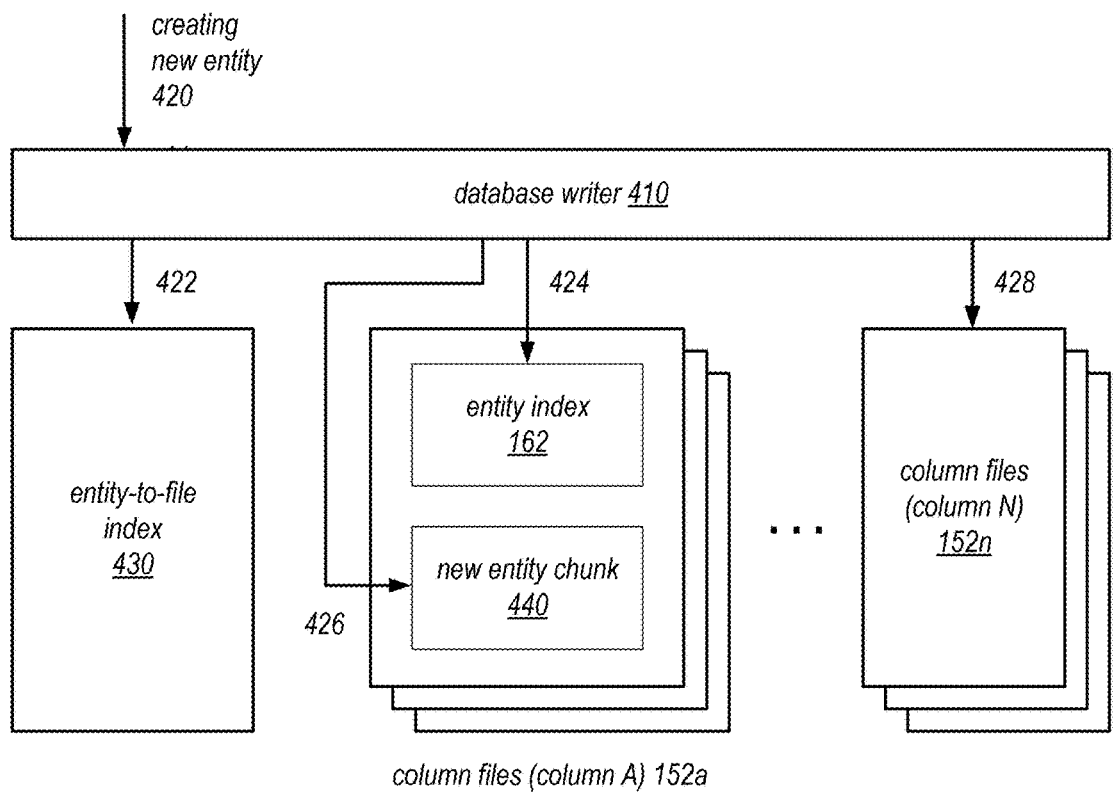
FIGS. 4A and 4B illustrate the operations of a database writer when creating and deleting an entity stored in column files with the columnar data storage format, according to some embodiments.
Figure 4B:
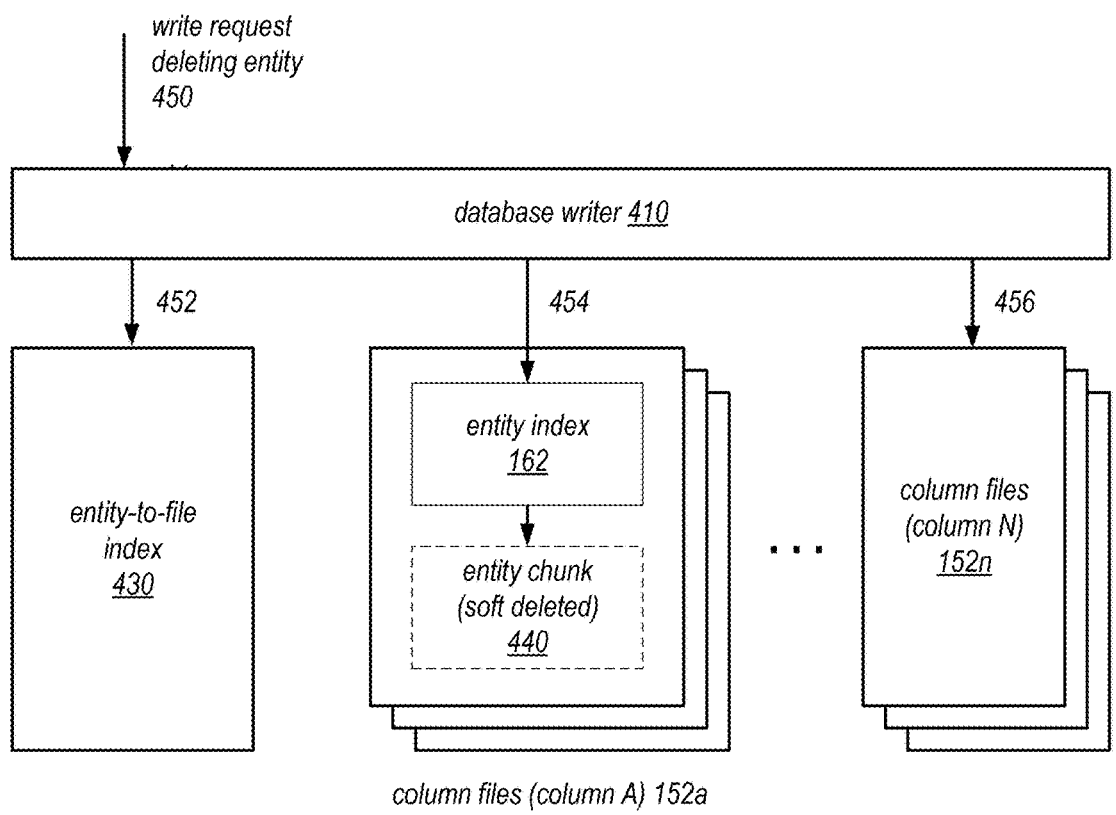

FIGS. 4A and 4B illustrate the operations of a database writer when creating and deleting an entity stored in column files with the columnar data storage format, according to some embodiments.

As shown in FIG. 4A, in some embodiments, a client may create a new entity in the database system by issuing a write request 420 that refers to the new entity. The database write API may automatically create the entity as a result of the write, and does not require the client to take the explicit step of creating the entity.

As shown, the database writer 410 may first update 422 an entity-to-file index 430 to add the new entity. As discussed, in some embodiments, there may be a set of column files for each column (e.g. column files 152a for column A), and the entity-to-file index 430 may be used to track which column file in the set stores each entity. In some embodiments, the entity-to-file index 430 may be a separate file stored in the directory structure of the table and may include some of the entity metadata discussed in connection with FIG. 3B.

In some embodiments, the database writer 410 may check the entity-to-file index 430 to determine whether the entity specified in the write request 420 is a new entity. If so, the database writer 410 will assign the new entity to a column file, for example, by selecting the last column file for the column or hashing the entity identifier and mapping the result to one of the files. In some embodiments, the database writer 410 may not necessarily maintain an entity-to-file index 430. Rather, the writer may simply hash the entity ID to a column file, and then scan the identified file to determine that the entity is new.

As shown, the new entity creation process will add the new entity to the selected column file 152a for column A. This operation will involve adding 426 a new entity chunk 440 to the column file and updating 424 the entity index 162 in the file to reflect the location of the new entity chunk. As shown, this operation will be performed 428 for each column of the table, including column N, so that a new entity chunk is created in a column file for each column. After the new entity has been created in the column files, the database writer 410 will carry out the write request 420 as normal.

FIG. 4B depicts a process in which an entity is deleted as the result of a write request 450. Again, the database system may provide a write API that does not require the client to explicitly delete the entity. For example, in some embodiments, the database system may be configured to automatically delete an entity when all data associated with an entity has been deleted. In some embodiments, this automatic deletion may be performed during a file compaction process subsequent to the write request 450.

As shown in this example, to delete the entity, the database writer 410 first checks the entity-to-file index 430 to identify the column file for the column (e.g. column A) that contains the entity. The database writer then updates 454 the entity index 162 in that file, so that the entity chunk 440 is soft deleted. For example, the database writer may set the deleted flag 382 for the entity in the entity index. The setting of the deleted flag 382 will cause the entity chunk to become invisible to subsequent database reads. The deleted entity chunk 440 may not be removed immediately from the column file. Instead, it will be removed during a later file compaction process. As shown, the entity deletion operation will be performed 456 for each column of the table, including column N.

Figure 5:
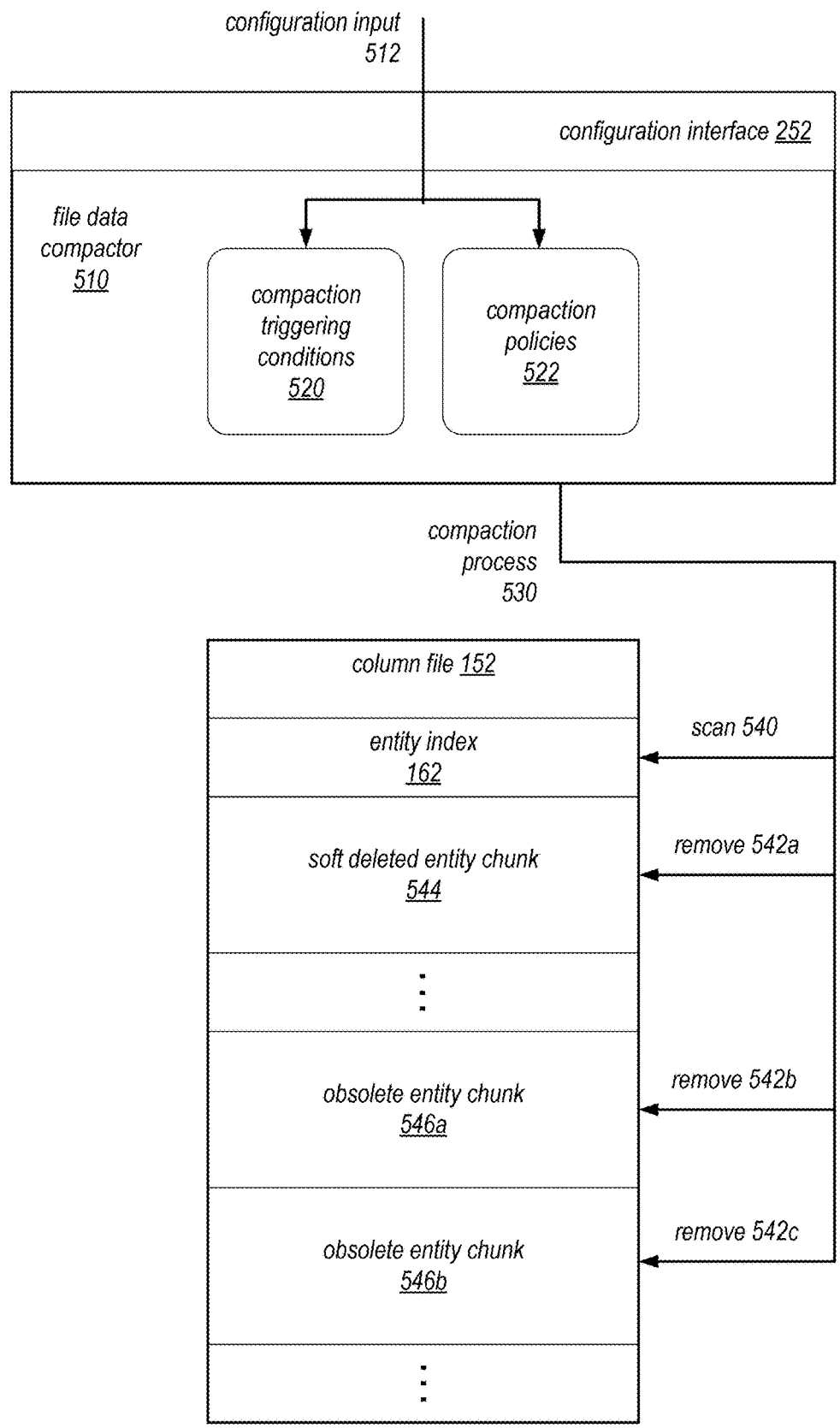
FIG. 5 illustrates operations of a file data compactor that performs a compaction process on column files in the columnar data storage format, according to some embodiments.

FIG. 5 illustrates operations of a file data compactor that performs a compaction process on column files in the columnar data storage format, according to some embodiments.

The depicted file data compactor 510 may be implemented as a component of the database system 120, and tasked with performing a compaction process 530 on the column files 152 to remove dead space (e.g. deleted values or entities) from the files.

As shown, a compaction process 530 may involve a number of steps. In some embodiments, the compaction process may generate a new column file from the old column file, and then atomically replace the old file with the new file.

At operation 540, the compactor scans 540 the entity index 162 to find any entities have been soft deleted (e.g. where the entity's deleted flag 382 is set) or any dormant or obsolete entity chunks produced by updates. The compactor will permanently remove 542 these soft deleted chunks 542 or obsolete entity chunks 548. In some embodiments, the entity index 162 only stores the chunk locations of the live or latest entity chunks. From this and other metadata stored in the entity index, the compaction process will be able infer which portions of the column file can be safely purged. For example, any portion of the file that does not fall within a live entity chunk can be assumed to be removable. In some embodiments, the entity index will also store the locations of obsolete entity chunks and indicate that these locations correspond to obsolete chunks. In such embodiments, the compaction will use these locations to remove the obsolete entity chunks, and then delete their location references in the entity index.

As shown, the file data compactor 510 may provide a configuration interface (e.g. configuration interface 252) that allows clients to specify configuration input 512 to control various operational parameters of the compactor. In some embodiments, the configuration interface may allow the client to define triggering conditions 520 for the compaction process 530. For example, file compactions may be configured to occur periodically at regular time intervals, in response to a write to the file, after a certain number of writes to the file, when the amount of dead space in the file exceeds a threshold, or when the amount of free space in the file falls below a threshold, etc.

In some embodiments, the configuration interface may allow the client to define various compaction policies 522 for the compaction process. Such policies may specify, for example, how long the compactor will wait before permanently deleting a soft deleted value or entity, how much free space to add to an entity chunk, times when compactions should not occur (e.g. when the database system is experiencing heavy load), etc. In some embodiments, the configuration interface may allow a user to manually initiate a compaction process and monitor the progress of the compaction process.

Figure 6:
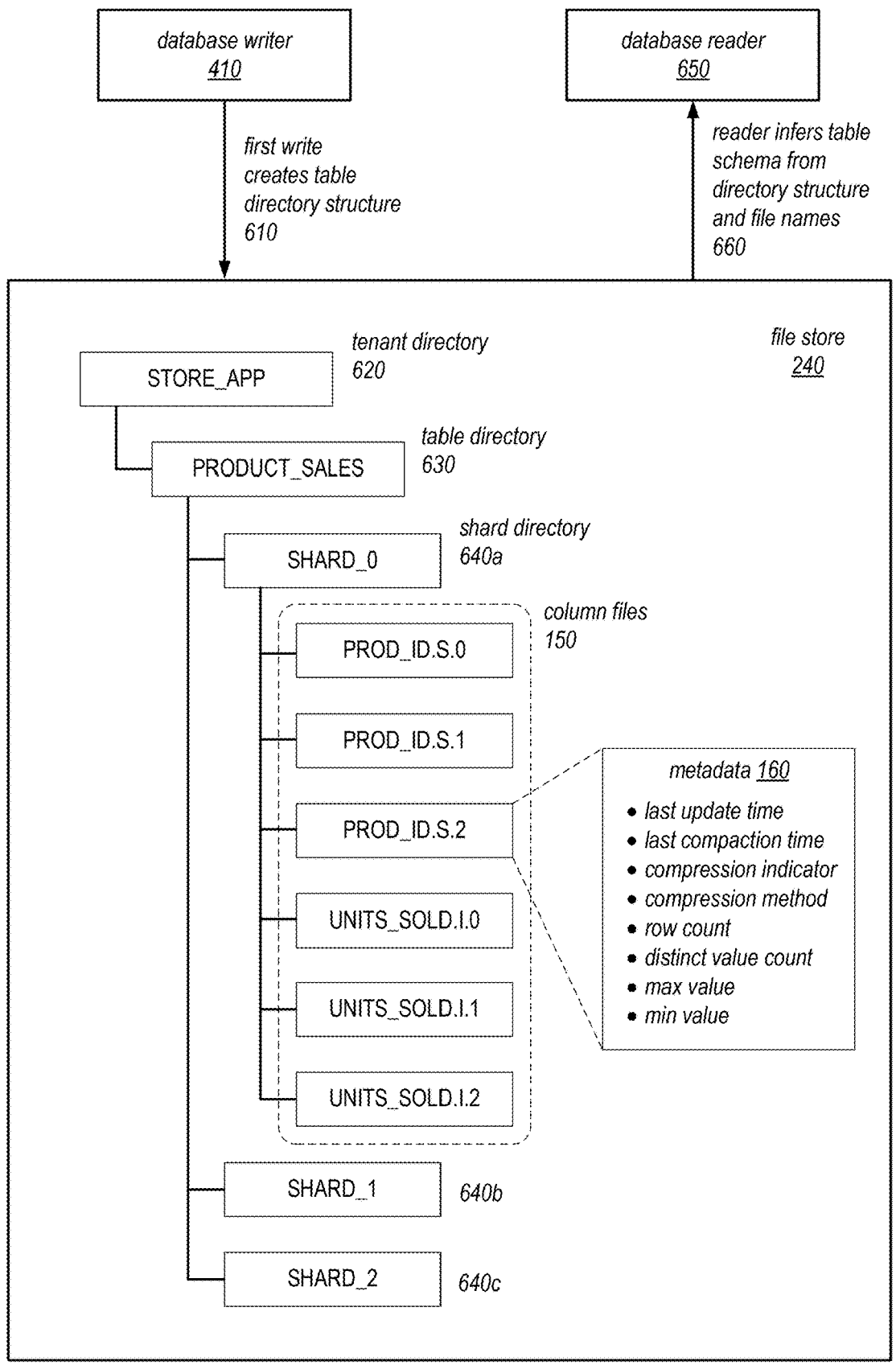
FIG. 6 illustrates column files stored based on a naming and placement convention to encode table schema and storage metadata, according to some embodiments.

FIG. 6 illustrates column files stored based on a naming and placement convention to encode table schema and storage metadata, according to some embodiments.

As shown in this example, the file store 240 stores the column files 150 for a table PRODUCT_SALES in a directory structure. In some embodiments, the directory structure may be created automatically by the database writer 410 upon the first write 610 to the table. In some embodiments, the write API for the database system will allow clients to create the table without having to explicitly define the table schema before the first write. In some embodiments, the write request may specify certain storage attributes of the table to be created, including for example a sharding scheme of the table, a compression algorithm to use for the table, and a consistency or durability policy of the table.

In some embodiments, the file store may support multi-tenant storage for many clients that use the database system. Accordingly, the top-level directory in the directory structure is a tenant directory 620 for a particular tenant (STORE_APP). Each tenant will have its own separate tenant directory.

At the next level in the directory structure is the table directory 630, whose name indicates the table name. A particular tenant may have many tables stored under the same tenant directory. In some embodiments, all metadata about the table, including table schema information and storage metadata, is stored under the table directory 630. This directory structure avoids the need for a centralized metadata repository outside of the table directory and allows the table to be easily migrated using a simple directory move.

At the next level in the directory structure is a set of shard directories 640*a-c*. In some embodiments, the database system may distribute the data of the table into multiple shards, in order to enable parallel table access and separate management of the shards. In some embodiments, the database system may use separate instances of database readers and writers for each shard. Sharding may be implemented on a row-wise or column-wise basis, and based on a sharding policy that aims to evenly distribute the access load of the table across the shards. In some embodiments, the sharding may be performed based on the primary key or entity ID of the table.

At the next level in directory structure are the column files 150. In this example, column files for multiple columns (PROD_ID and UNITS_SOLD) are stored in the same directory. In other embodiments, columns for each column may be stored in a separate directory. As shown, the column files are named according to a naming convention that indicates the column's name, a letter code indicating the data type of the column, and a sequence number that indicates the ordering of the column files. In this example, the letter S indicates a string data type, and the letter I indicates an integer data type. Based on this file naming and placement convention, the database reader 650 does not need to query a separate metadata repository to determine the table schema. Rather, the reader can use the convention to infer or dynamically discover 660 the table schema information, including column names and column data types.

As shown, in some embodiments, each column file will contain additional metadata 160, as discussed in connection with FIG. 1. Such metadata information may include a last update time or compaction time of the file, a compression indicator indicating whether the value contents in the file are compressed, and if so, a compression method. The metadata may also include data statistics about the values stored in the file, such as row count, a distinct value count, the maximum value, and the minimum value. In some embodiments, some of this metadata (e.g. last update time) may be maintained by the file store 240. In some embodiments, some of the metadata (e.g. compression indicator and compression method) may be encoded as part of the file name.

Figure 7:
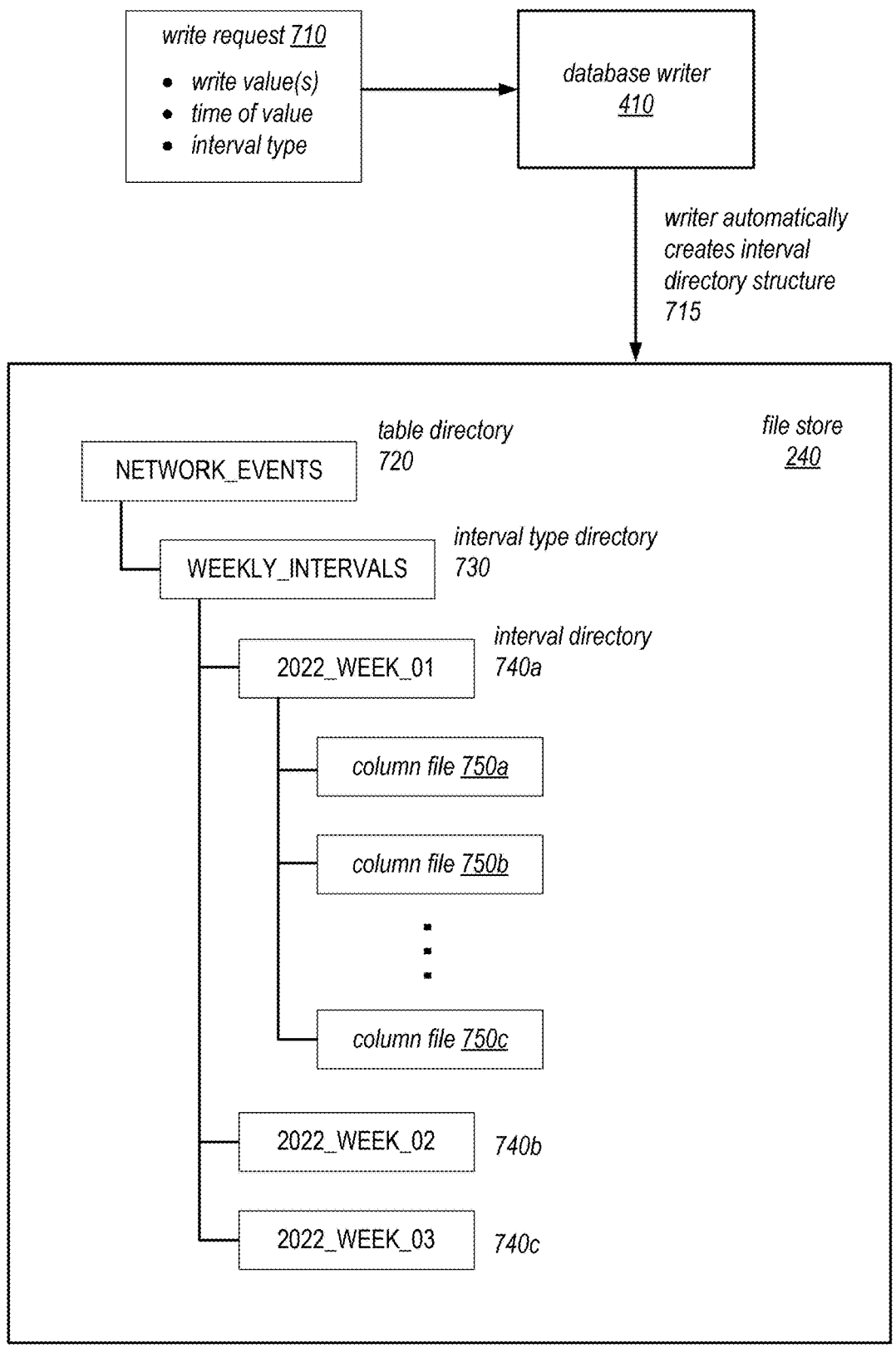
FIG. 7 illustrates column files stored based on a naming and placement convention to group time-based data into regular time intervals, according to some embodiments.

FIG. 7 illustrates column files stored based on a naming and placement convention to group time-based data into regular time intervals, according to some embodiments.

In some embodiments, the database system 120 may allow time-based data (e.g. timestamped events) to be grouped into regular intervals (e.g. hourly, daily, weekly intervals). The grouping may be accomplished by storing same-interval values in common interval directories. In this way, all data in the same time interval can be fetched or modified together, possibly as an atomic unit. In some embodiments, this grouping also enables aggregate statistics to be computed and stored for the intervals.

As shown in this example, the database system provides a write API that allow a client to specify a write request 710 indicating (1) a write value, (2) the time associated with the value, and (3) a desired type of interval to use to assign the value to a time interval. The database writer 410 will automatically determine the correct interval for the value based on the write request parameters. In some embodiments, the database writer will automatically create or modify 715 the interval directory structure as needed. For example, if the write request specifies a value that requires a new interval directory to be created, the database writer will automatically create the directory.

As shown, the directory structure in this example indicates that data for the table is to be stored in weekly intervals. Under the table directory 720, an interval type directory 730 is used to store the weekly interval data. In some embodiments, data for a table may be stored under more than one interval type. If so, a second interval type directory may be created. In some embodiments, clients may need to issue two write calls to store the same data under two different interval types. As shown, the interval type directory 730 includes a number of interval directories 740*a-c*. Each interval directory corresponds to an individual weekly interval, and holds column files 750*a-c* whose data belongs within that interval. As discussed, new interval directories may be created by the database writer as needed. In some embodiments, the data writer or a file compactor component may remove old interval directories after a specified amount of time has passed, in accordance with a data retention policy.

Figure 8:
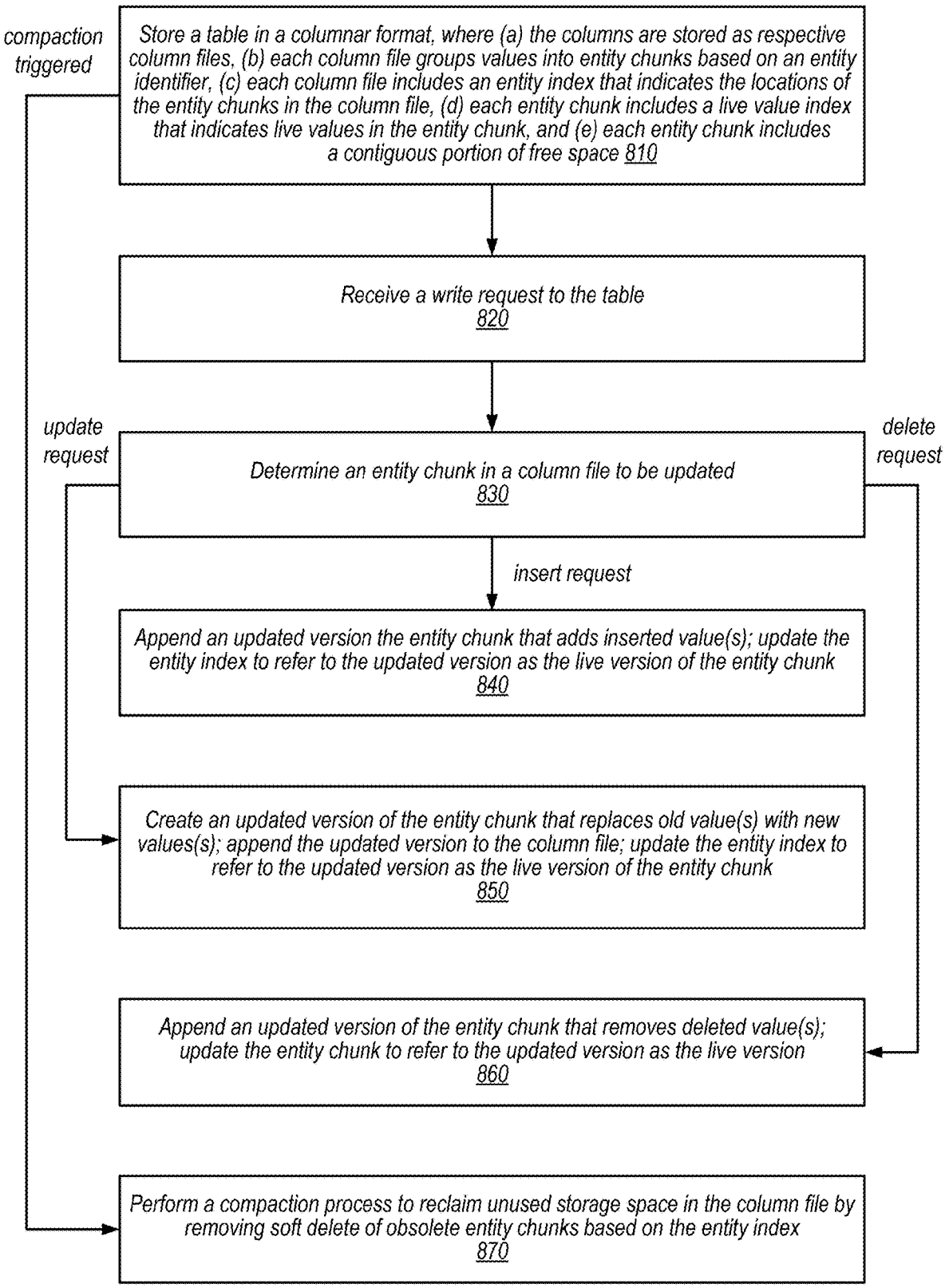
FIG. 8 is a flowchart illustrating a process of a database system performing write requests to write column files stored in the columnar data storage format, according to some embodiments.

FIG. 8 is a flowchart illustrating a process of a database system (e.g. database system 120) performing write requests to write column files stored in the columnar data storage format, according to some embodiments.

The process begins at operation 810, where a table (e.g. table 130) is stored in a columnar format. The database system may store the columns so that (a) the columns are stored as respective sets of column files, (b) each column file (e.g. column file 152) groups values into entity chunks (e.g. entity chunk 164) based on an entity identifier, (c) each column file includes an entity index (e.g. entity index 162) that indicates the locations of the entity chunks in the column file, (d) each entity chunk includes a live value index (e.g. live value index 170) that indicates live values in the entity chunk, and each entity chunk includes a continuous portion of free space (e.g. free space 174). In some embodiments, the column files may be stored as part of a strongly consistent file store (e.g. a file system), which acts as the storage layer of the database system.

At operation 820, the database system receives a write request to the table. The write request may be received by a database writer module (e.g. database writer 410) of the database system, and via a write API provided by the database system. In some embodiments, the write request may be specified in SQL.

At operation 830, the database system (or database writer) determines an entity chunk in a column file to be updated for the write request. For example, the write request may specify an entity and the database system will select the column file based on the specified entity. For example, the database writer may determine the column file based on a hash value of the entity's identifier. Once the column file is determined, the database writer may access the entity index in the file to determine the location of the entity chunk for the entity.

If the write request is an insert request, the process proceeds to operation 840, where new values specified by the insert are added to an updated version of the entity chunk, which is appended to the column file. The database writer will also update the entity index to refer to the appended entity chunk as the live version of the entity chunk.

If the write request is an update request, the process proceeds to operation 850. In this operation, an updated version of the entity chunk is created that replaces one or more old values with one or more new values as specified by the update request. The updated entity chunk is appended to the column file, and the entity index is updated to refer to the updated version as the live version of the entity chunk, so that subsequent table reads will only see the live version of the entity chunk.

If the write request is a deletion request, the process proceeds to operation 860. In this operation, an updated version of the entity chunk (deleting one or more values according to the delete request) is created and appended to the column file. Again, the entity index is updated to refer to the updated version as the live version of the entity chunk.

Finally, operation 870 is performed when a compaction is triggered, for example, when one or more configured triggering conditions are satisfied. In operation 870, a compaction process (e.g. as shown in FIG. 5) is performed to reclaim unused storage space in the column file. The compaction process will remove soft deleted or obsolete entity chunks in the file based on the entity index. In some embodiments, the compaction process may also add more free space to the remaining entity chunks as needed.

Figure 9:
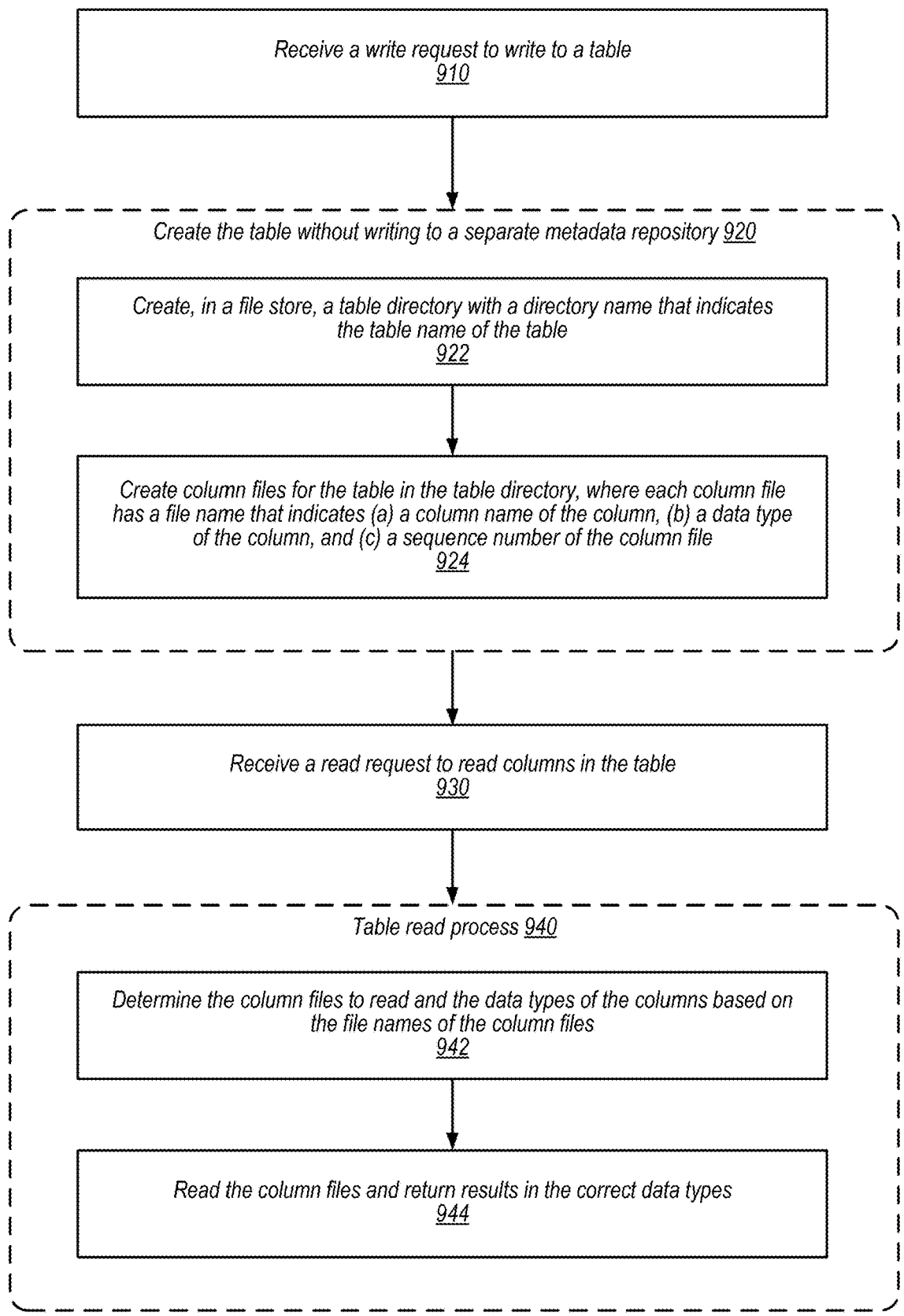
FIG. 9 is a flowchart illustrating a process of a database system creating a table stored in the columnar data storage format and then reading the table, according to some embodiments.

FIG. 9 is a flowchart illustrating a process of a database system (e.g. database system 120) creating a table stored in the columnar data storage format and then reading the table, according to some embodiments.

At operation 910, a write request to write to a table (e.g. write request 610) is received by the database system. In some embodiments, the table may not actually exist at the time of the write request. If the database system detects that the table does not exist, it will automatically create the table, including the directory structure of the table, in the file store. The database system may provide a write API that does not require the client to explicitly create the table before the write request. In some embodiments, if the table already exists, but the write request specifies a new column for the table, the database system will automatically create the new column, including any new column files, in the file store.

As shown, the table creation process 920 is performed without writing to a separate metadata repository (e.g. a centralized metadata store outside the table directory structure). Rather, all schema and storage metadata for the table will be stored and/or encoded in the table directory structure, so that the table directory is a self-containing repository for all metadata about the table.

At operation 922, a table directory (e.g. table directory 630) is created for the table in the file store. In some embodiments, the table directory will use a directory name that indicates the table name of the table, so that tables in the database system can be dynamically discovered by database readers.

At operation 924, column files for the table are created in the table directory, which may be in one or more subdirectories under the table directory. In some embodiments, each column file will use a file name that indicates (a) the column name of a column, (b) a data type of the column, and (c) a sequence number of the column file. The column file name will be used by database readers to infer the schema information about each column. In some embodiments, the column files may be grouped in separate directories based on their column. In some embodiments, column files for different columns may be stored in the same directory. In some embodiments, additional metadata about the columns may be stored in a metadata section (e.g. metadata section 160) inside the column files.

At operation 930, after the table has been created, a read request for the table is received by the database system. The table read process 940 will be performed by a database reader (e.g. database reader 650), At operation 942, the database reader determines the column files to read for the read request and the data types of the columns based on the file names of the column files. For example, the read request (e.g. a SQL query) may specify a set of column names of the table. These column names will be used to identify the column files that will be accessed. Moreover, the database reader will determine the data types of the columns based on the naming conventions of the column files. For example, the column file names will contain a single letter code, as shown in FIG. 6, to indicate the column data type.

At operation 944, the database reader will read the column files and return the results of the read request in the correct data types. For example, the database reader will use the determined column data types to allocate the correct amount of memory or create the correct types of data objects for the read results. In some embodiments, the database reader may download an entire column file or row group from the file store, and transform the file contents into a result set in a database engine node remote from the file store.

Figure 10:
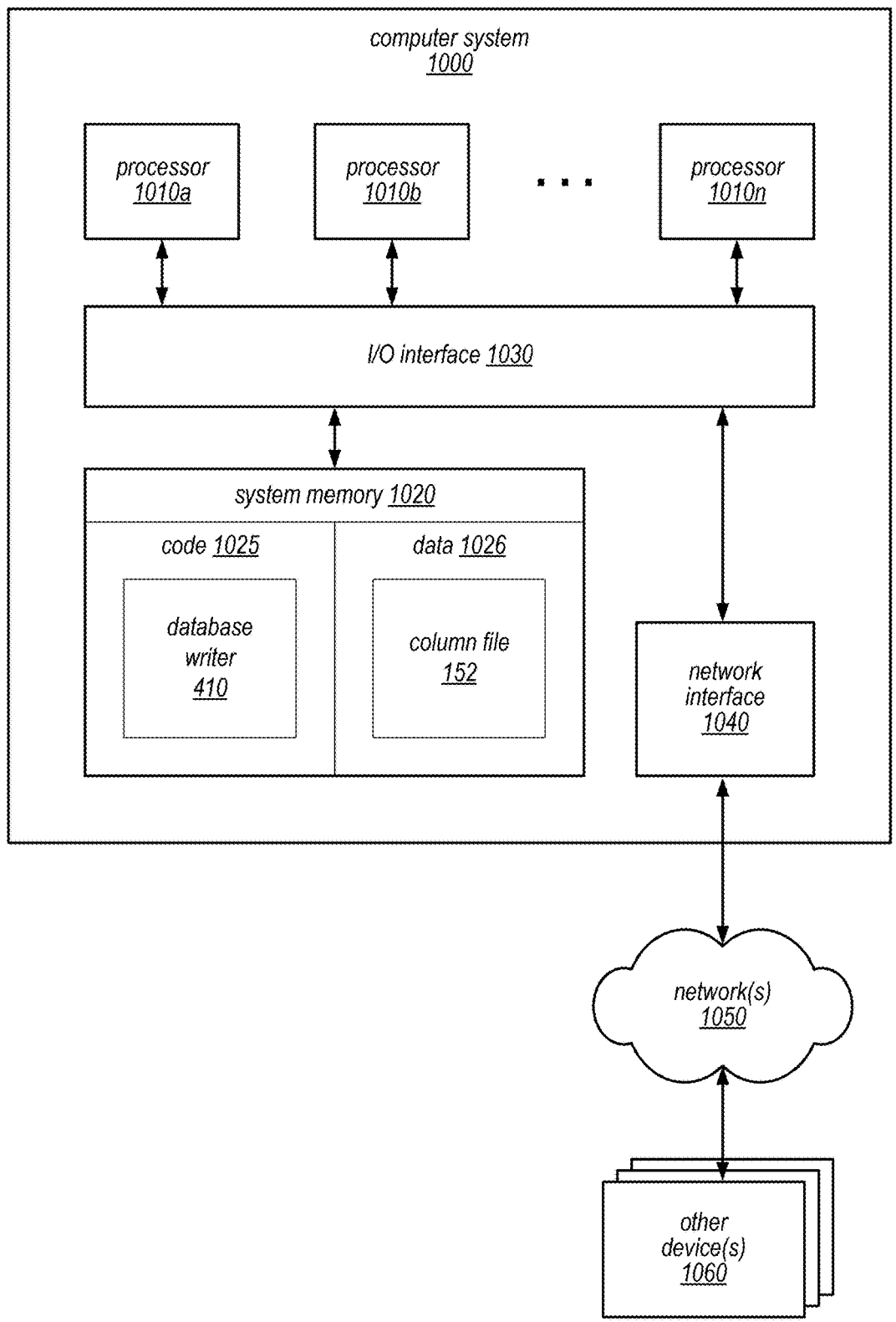
FIG. 10 is a block diagram illustrating a computer system that can be used to implement one or more portions of a database system that stores table data in column files in the columnar data storage format, according to some embodiments.

FIG. 10 is a block diagram illustrating a computer system that can be used to implement one or more portions of a database system (e.g. database system 120) that stores table data in column files in the columnar data storage format, according to some embodiments.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device. In some embodiments, the computer system 1000 may be an embedded system that performs a dedicated function within a specialized hardware system, such as a networking device (e.g. a router). In some embodiments, the network anomaly detection system may be implemented on an instance of a virtual machine, which may be running in a cloud-based environment such as a platform service provider network, as discussed in connection with FIG. 2.

As shown, computer system 1000 includes one or more processors 1010, which may include multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010a-n, as shown. The processors 1010 may be any suitable processor capable of executing instructions. For example, in various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another server application executing on another computer system, as described herein.

As shown, computer system 1000 may use its network interface 1040 to communicate with one or more other devices 1060, such as persistent storage devices and/or one or more I/O devices. In some embodiments, some of these other devices may be implemented locally on the computer system 1000, accessible via the I/O interface 1030. In various embodiments, persistent storage devices may include disk drives, tape drives, solid state memory, other mass storage devices, or any other persistent storage device. The computer system 1000 may store instructions and/or data in persistent storage devices, and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR RAM, synchronous dynamic RAM (SDRAM), EEPROM, non-volatile/Flash-type memory, etc.). The system memory 1020 may be used to store code 1025 or executable instructions to implement the methods and techniques described herein. For example, the executable instructions may include instructions to implement executable modules of the database system, such as database writer 410. The system memory 1020 may also be used to store data 1026 needed by the executable instructions. For example, the in-memory data 1026 may be used to store the column files 152, as discussed previously.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1050. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. One or more computing systems that implements a columnar database system, configured to:
   store a table in a file store, wherein
      table data of the table is stored in a plurality column files in a table directory that has a directory name that indicates a table name of the table,
      each of the column files are associated with a corresponding column of the table,
      each of the column files has a file name that indicates (a) a column name of the corresponding column, (b) a data type of the corresponding column, and (c) a sequence number of the column file that indicates an ordering of column files, and
      each of the column files stores metadata about the column file including (a) a last update time of the column file and (b) a number of rows stored in the column file;
   receive a client request to update the table, and in response:
      determine, based on a specified column name indicated in the client request, one or more column files in the table directory to be updated;
      update a column file according to the client request, including to mark an existing chunk of the column file as obsolete and append a new chunk to the column file; and
      update the metadata in the column file including the last update time of the column file.

2. The system of claim 1, wherein
the table includes columns of different data types including a string data type and an integer data type.

3. The system of claim 1, wherein
the table is stored as a plurality of shards; and
the column files are distributed in a plurality of shard directories under the table directory that correspond to each of the shards.

4. The system of claim 1, wherein the metadata stored in the column file comprises one or more of:
   a last compaction time of the column file,
   an indication of whether values in the column file are compressed, and
   a compression algorithm used to compress values in the column file.

5. The system of claim 1, wherein the metadata stored in the column file comprises one or more of:
   a number of distinct values stored in the column file,
   a maximum value stored in the column file, and
   a minimum value stored in the column file.

6. The system of claim 1, wherein
the table stores time-based data sorted according to a time order, and
the sequence numbers of the column files reflect the time order.

7. The system of claim 1, wherein
the client request specifies (a) a value to be updated, (b) a time of the value, and (c) an interval type to use to determine a time interval to be updated, and
the columnar database system is configured to:
  determine that the time interval to be updated based on the specified time and the interval type; and
  select the column file to be updated based on the time interval.

8. The system of claim 7, wherein
the columnar database system is configured to store the table data of the table according to multiple interval types, including two or more of: hourly intervals, daily intervals, and weekly intervals.

9. The system of claim 8, wherein
the columnar database system is configured to store the table data in different interval directories under the table directory corresponding to the multiple interval types.

10. The system of claim 9, wherein the columnar database system is configured to:
determine the interval type specified by the client request requires a new interval directory to be created for the table, and
automatically create the new interval directory and perform the update specified by the client request on data in the new interval directory.

11. A method comprising:
performing, by one or more computing systems that implements a column database system:
  storing a table in a file store, wherein
    table data of the table is stored in a plurality column files in a table directory that has a directory name that indicates a table name of the table,
    each of the column files are associated with a corresponding column of the table,
    each of the column files has a file name that indicates (a) a column name of the corresponding column, (b) a data type of the corresponding column, and (c) a sequence number of the column file that indicates an ordering of column files, and
    each of the column files stores metadata about the column file including (a) a last update time of the column file and (b) a number of rows stored in the column file;
  receiving a client request to update the table, and in response:
    determining, based on a specified column name indicated in the client request, one or more column files in the table directory to be updated;
    updating a column file according to the client request, including marking an existing chunk of the column file as obsolete and appending a new chunk to the column file; and
    updating the metadata in the column file including the last update time of the column file.

12. The method of claim 11, wherein
the table includes columns of different data types including a string data type and an integer data type.

13. The method of claim 11, wherein
the table is stored as a plurality of shards, and
the column files are distributed in a plurality of shard directories under the table directory that correspond to each of the shards.

14. The method of claim 11, wherein the metadata stored in the column file comprises one or more of:
a last compaction time of the column file,
an indication of whether values in the column file are compressed, and
a compression algorithm used to compress values in the column file.

15. The method of claim 11, the metadata stored in the column file comprises one or more of:
a number of distinct values stored in the column file,
a maximum value stored in the column file, and
a minimum value stored in the column file.

16. The method of claim 11, wherein
the table stores time-based data sorted according to a time order, and
the sequence numbers of the column files reflect the time order.

17. The method of claim 11, wherein
the client request specifies (a) a value to be updated, (b) a time of the value, and (c) an interval type to use to determine a time interval to be updated, and
the method further comprises the columnar database system:
  determining the time interval to be updated based on the specified time and the interval type; and
  selecting the column file to be updated based on the time interval.

18. The method of claim 17, further comprising:
the columnar database system storing the table data of the table according to multiple interval types, including two or more of: hourly intervals, daily intervals, and weekly intervals.

19. The method of claim 18, further comprising:
the columnar database system: storing the table data in different interval directories under the table directory corresponding to the multiple interval types.

20. The method of claim 19, further comprising the columnar database system:
determining that the interval type specified by the client request requires a new interval directory to be created for the table; and
automatically creating the new interval directory and performing the update specified by the client request on data in the new interval directory.

* * * * *